(12) United States Patent
Hashizume

(10) Patent No.: US 12,072,616 B2
(45) Date of Patent: Aug. 27, 2024

(54) WAVELENGTH CONVERSION DEVICE, LIGHT SOURCE DEVICE, AND PROJECTOR

(71) Applicant: SEIKO EPSON CORPORATION, Tokyo (JP)

(72) Inventor: Toshiaki Hashizume, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 141 days.

(21) Appl. No.: 17/706,738

(22) Filed: Mar. 29, 2022

(65) Prior Publication Data

US 2022/0308433 A1    Sep. 29, 2022

(30) Foreign Application Priority Data

Mar. 29, 2021 (JP) ................................. 2021-054821

(51) Int. Cl.
  *G03B 21/20* (2006.01)
  *G02B 26/00* (2006.01)
  *G03B 21/16* (2006.01)

(52) U.S. Cl.
  CPC ......... *G03B 21/204* (2013.01); *G02B 26/008* (2013.01); *G03B 21/16* (2013.01); *G03B 21/208* (2013.01)

(58) Field of Classification Search
  CPC .. G03B 21/204; G03B 21/16; G03B 21/2033; G03B 21/2073; G03B 21/2066; G02B 26/008; G02B 26/208
  See application file for complete search history.

(56) References Cited

U.S. PATENT DOCUMENTS

| | | | | |
|---|---|---|---|---|
| 5,055,832 A | * | 10/1991 | Browne | G09F 9/375 345/110 |
| 9,664,893 B2 | | 5/2017 | Yamagishi et al. | |
| 10,114,276 B2 | | 10/2018 | Kobayashi et al. | |
| 2006/0062559 A1 | * | 3/2006 | Naka | G02B 7/102 396/79 |
| 2014/0078472 A1 | * | 3/2014 | Masuda | G03B 21/204 353/31 |
| 2016/0077326 A1 | | 3/2016 | Yamagishi et al. | |
| 2017/0293211 A1 | | 10/2017 | Kobayashi et al. | |
| 2020/0033120 A1 | * | 1/2020 | Huang | G01S 7/481 |
| 2020/0081334 A1 | * | 3/2020 | Egawa | G03B 21/20 |

FOREIGN PATENT DOCUMENTS

| | | | | |
|---|---|---|---|---|
| CN | 101359076 | * | 2/2009 | |
| CN | 102096165 A | | 6/2011 | |
| CN | 106990653 B | * | 3/2019 | ............ F21V 29/505 |
| JP | 2014119670 | * | 6/2014 | |
| JP | 2016-066061 A | | 4/2016 | |
| JP | 2016224335 | * | 12/2016 | |
| JP | 2017072671 | * | 4/2017 | |
| JP | 2018-190664 A | | 11/2018 | |
| WO | WO2016-056285 A | | 4/2016 | |

* cited by examiner

*Primary Examiner* — Fatima N Farokhrooz
(74) *Attorney, Agent, or Firm* — Dority & Manning, P.A.

(57) ABSTRACT

A wavelength. conversion device includes a motor having a rotation axis and a hollow space, a wavelength converter converting incident first light in a first wavelength band to second light in a second wavelength band that is different from the first wavelength band, and a coupling member thermally coupled to the wavelength converter. At least a part of the coupling member is arranged in the hollow space. The motor changes a position of incidence of the first light on the wavelength converter relatively with respect to the wavelength converter.

15 Claims, 7 Drawing Sheets

WAVELENGTH CONVERSION DEVICE, LIGHT SOURCE DEVICE, AND PROJECTOR

The present application is based on, and claims priority from JP Application Serial Number 2021-054821, filed Mar. 29, 2021, the disclosure of which is hereby incorporated by reference herein in its entirety.

BACKGROUND

1. Technical Field

The present disclosure relates to a wavelength conversion device, a light source device, and a projector.

2. Related Art

According to the related art, a light source device having a solid-state light source, a phosphor wheel that converts the wavelength of excitation light emitted from the solid-state light source and emits fluorescence, and a motor) that rotates the phosphor wheel, is known. WO2016/05625 is an example of this device.

The phosphor wheel described in WO2016/056285 has a disk-like substrate, a phosphor layer formed at one surface of the substrate, a reflection film provided between the substrate and the phosphor layer, and a heat radiation structure having a plurality of heat radiation fins. When excitation light enters the phosphor layer, the phosphor layer absorbs a part of the excitation light and emits light in a predetermined wavelength range. The phosphor layer generates heat when excited by the excitation light to emit light. As the temperature of the phosphor layer rises, the fluorescence conversion efficiency of the phosphor layer drops. To cope with this, the motor rotationally drives the phosphor wheel to change the position irradiated with the excitation light on the phosphor layer with time, thus restraining the temperature rise at the irradiated position. The heat of the phosphor layer is transferred to the heat radiation structure via the substrate and is thus radiated.

However, in the phosphor wheel described in WO2016/056285, the heat radiation structure is provided at the outside of the motor in a radial direction about the rotation axis of the motor. This poses a problem in that the phosphor wheel tends to be large. Also, as the solid-state light source emits blue laser light to the phosphor, the high energy of the blue laser light causes optical dust collection and thus poses a problem of dust adhering to the phosphor layer and the condensing lens. To cope with this, the phosphor wheel is covered by a casing to achieve dust-proofness. However, sealing, the phosphor wheel poses a problem in that the heat is trapped in the casing.

Therefore, a configuration of a wavelength conversion device that can be configured in a small size is desired.

SUMMARY

A wavelength conversion device according to a first aspect of the present disclosure includes a motor having a rotation axis and a hollow space, a wavelength converter converting incident first light in a first wavelength band to second light in a second wavelength band that is different from the first wavelength band, and a coupling member thermally coupled to the wavelength converter. At least a part of the coupling member is arranged in the hollow space. The motor changes a position of incidence of the first light on the wavelength converter relatively with respect to the wavelength converter.

A light source device according to a second aspect of the present disclosure includes a light source emitting first light and the wavelength conversion device according to the first aspect, on which the first light emitted from the light source is incident.

A projector according to a third aspect of the present disclosure includes the light source device according to the second aspect, a light modulator modulating light emitted from the light source device, and an optical projection device projecting the light modulated by the light modulator.

FIG, 6 is a schematic view showing the configuration of a wavelength conversion device of a light source device provided in a projector according to a third embodiment.

Figure 7:
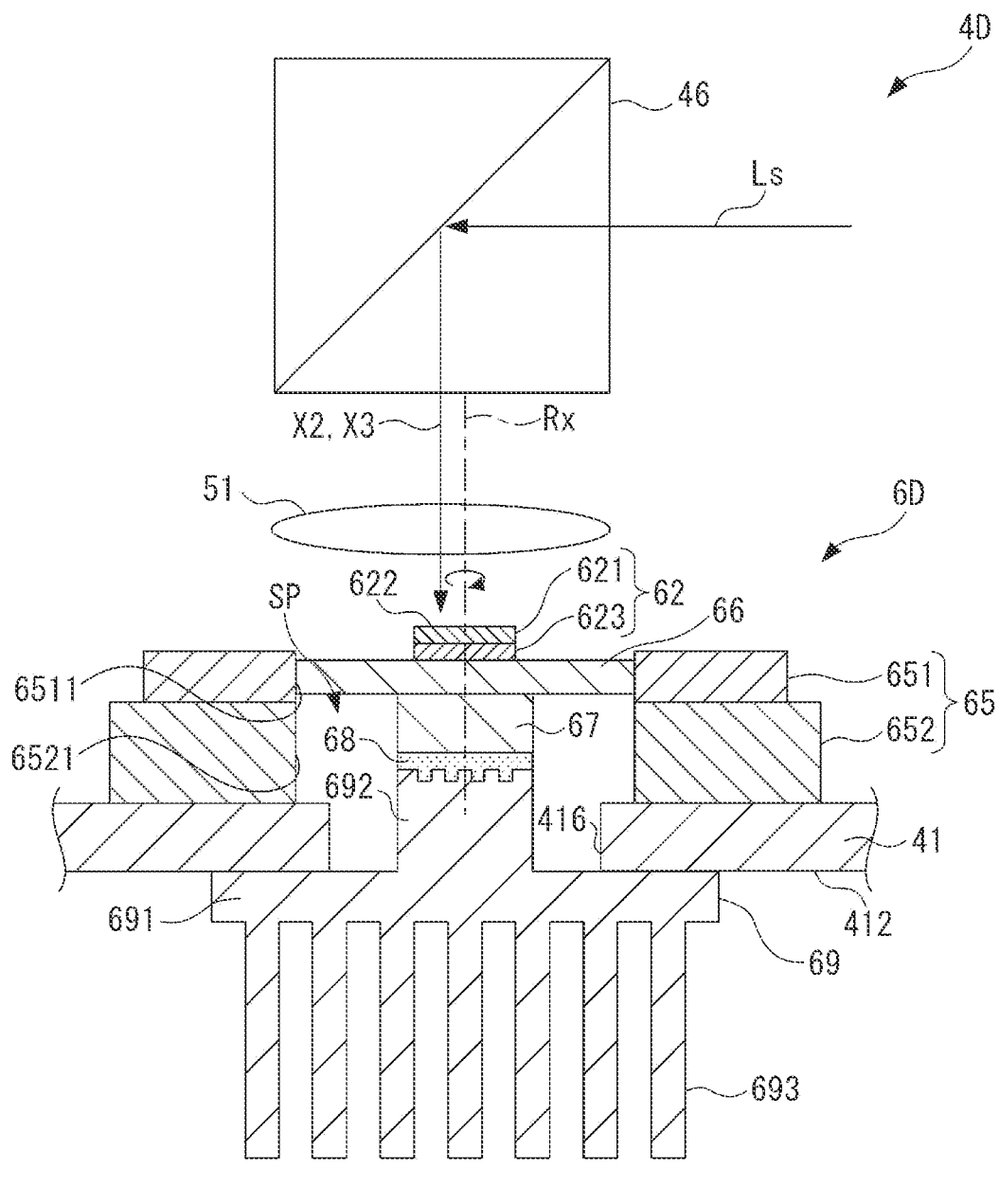

FIG. 7 is a schematic view showing the configuration of a wavelength conversion device of a light source device provided is a projector according to a fourth embodiment.

DESCRIPTION OF EXEMPLARY EMBODIMENTS

First Embodiment

Figure 1:
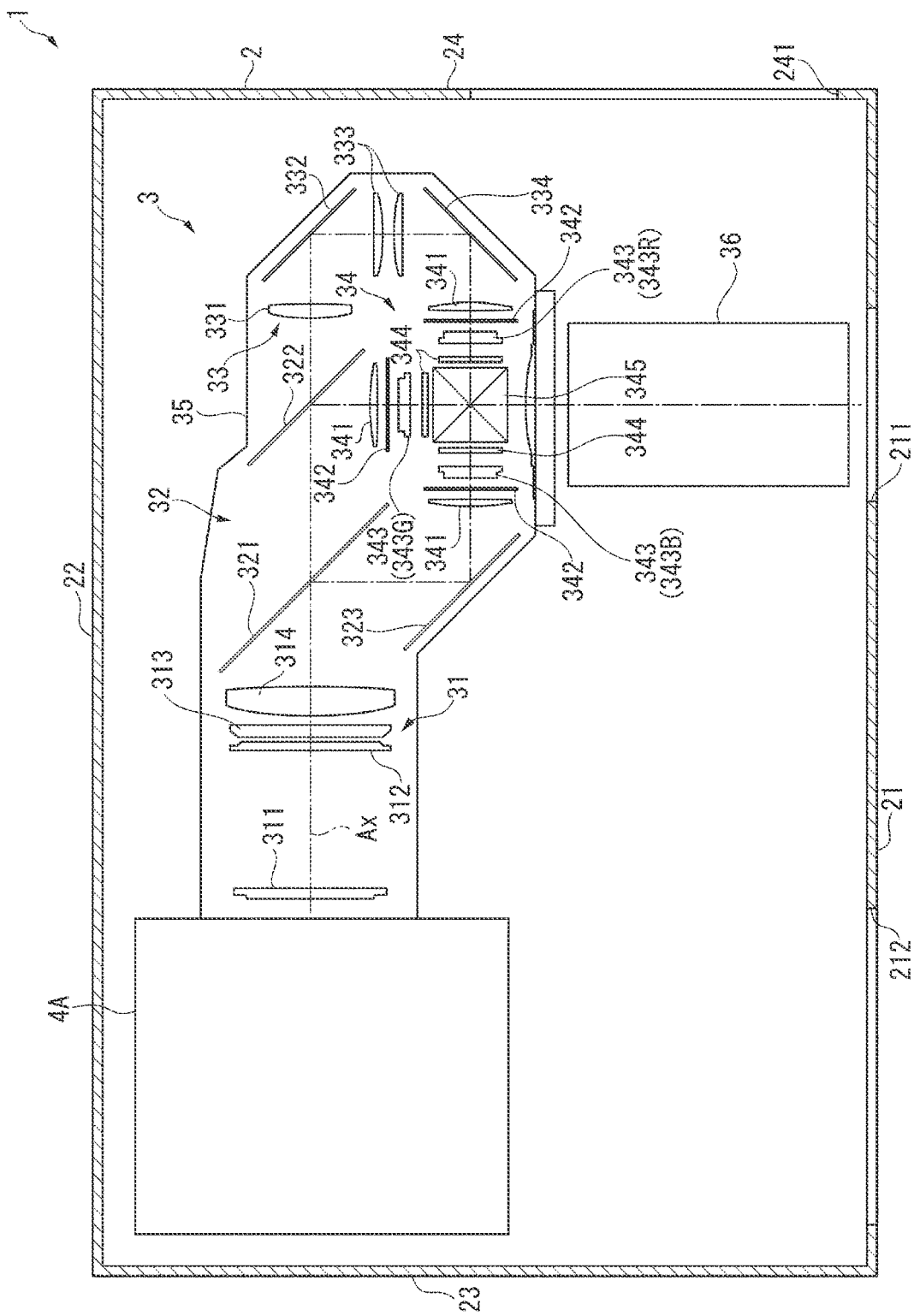
FIG. 1 is schematic view showing the configuration of a projector according to a first embodiment.

A first embodiment of the present disclosure will now be described with reference to the drawings.
Schematic Configuration of Projector FIG. 1 is a schematic view showing the configuration of a projector 1 according to this embodiment.

The projector 1 according to this embodiment modulates light emitted from a light source device 4A, described later, thus forms an image corresponding to image information, and projects the formed image in an enlarged form on a projection target surface such as a screen. As shown in FIG. 1, the projector 1 has an exterior casing 2 and an image projection device arranged inside the exterior casing 2. Although not illustrated, the projector 1 also has a control device that controls operations of the projector 1, a power supply device that supplies electric power to an electronic component forming the projector 1, and a cooling device that cools a cooling target forming the projector 1.
Configuration of Exterior Casing The exterior casing 2 forms the exterior of the projector 1. The exterior casing 2 accommodates the image projection device 3, the control device, the power supply device, and the cooling device. The exterior casing 2 has a top face part and a bottom face part, not illustrated, a front face part 21, a back face part 22, a left side face part 23, and a right side face part 24, and is formed substantially in the shape of a rectangular parallelepiped.

The front face part 21 has an opening 211 to expose a part of an optical projection device 36, described later. An image projected by the optical projection device 36 passes through the opening 211. The front face part 21 also has an outlet port 212 through which a cooling gas that has cooled a cooling target inside the projector 1 is discharged out of the exterior casing 2. The right side face part 24 has an inlet port 241 through which a gas outside the exterior casing 2 is introduced inside as a cooling gas.

Configuration of Image Projection Device

The image projection device 3 forms and projects an image corresponding to image information. The image projection device 3 has the light source device 4A, a homogenization device 31, a color separation device 32, a relay device 33, an image forming device 34, an optical component casing 35, and the optical projection device 36.

The light source device 4A emits light. The configuration of the light source device 4A will be described in detail later.

The homogenization device 31 homogenizes the light emitted from the light source device 4A. The light homogenized by the homogenization device 31 goes through the color separation device 32 and the relay device 33 and illuminates a modulation area of a light modulator 343, described later, in the image forming device 34. The homogenization device 31 has two lens arrays 311, 312, a polarization converter 313, and a superimposing lens 314.

The color separation device 32 separates the light incident from the homogenization device 31 into red, green, and blue color lights. The color separation device 32 has two dichroic mirrors 321, 322, and a reflection mirror 323 reflecting the blue light separated by the dichroic mirror 321.

The relay device 33 is provided on the optical path of the red light, which is longer than the optical path of the blue light and the optical path of the green light, and thus restrains the loss of the red light. The relay device 33 has a light incident-side lens 331, a relay lens 333, and reflection mirrors 332, 334.

In this embodiment, the relay device 33 is provided on the optical path of the red light. However, this is not limiting. For example, the blue light may be used as the color light having a longer optical path than the other color lights, and the relay device 33 may be provided on the optical path of the blue light.

The image forming device 34 modulates the incident red, green, and blue color lights, combines the modulated color lights together, and thus forms an image to be projected by the optical projection device 36. The image forming device 34 has three field lenses 341 provided corresponding to the incident color lights, three light incident-side polarizers 342, three light modulators 343, three light exiting-side polarizers 344, and one light combining device 345.

The light modulator 343 modulates the light emitted from the light source device 41 according to image information. The three light modulators 343 include a light modulator 343R modulating the red light, a light modulator 343G modulating the green light, and a light modulator 343B modulating the blue light. In this embodiment, the light modulator 343 is formed of a transmission-type liquid crystal panel. The light incident-side polarizer 342, the light modulator 343, and the light exiting-side polarizer 344 together form a liquid crystal light valve.

The light combining device 345 combines together the color lights modulated by the Light modulators 343B, 343G, 343R and thus forms an image. In this embodiment, the light combining device 345 is formed of a cross dichroic prism. However, this is not limiting. For example, the light combining device 345 can be formed of a plurality of dichroic mirrors.

The optical component casing 35 accommodates the homogenization device 31, the color separation device 32, the relay device 33, and the image forming device 34 inside. In the image projection device 3, an illumination optical axis Ax, which is an optical axis in design, is set. The optical component casing 35 holds the homogenization device 31, the color separation device 32, the relay device 33, and the image forming device 34 at predetermined positions on the illumination optical axis Ax. The light source device 4A and the optical projection device 36 are arranged at predetermined positions on the illumination optical axis Ax.

The optical projection device 36 projects the image incident from the image forming device 34 in an enlarged form on the projection target surface. That is, the optical projection device 36 projects the lights modulated by the light modulators 343E, 343G, 343R. The optical projection device 36 is formed, for example, as a lens set having a plurality of lenses accommodated in a cylindrical lens barrel.

Configuration of Light Source Device

Figure 2:
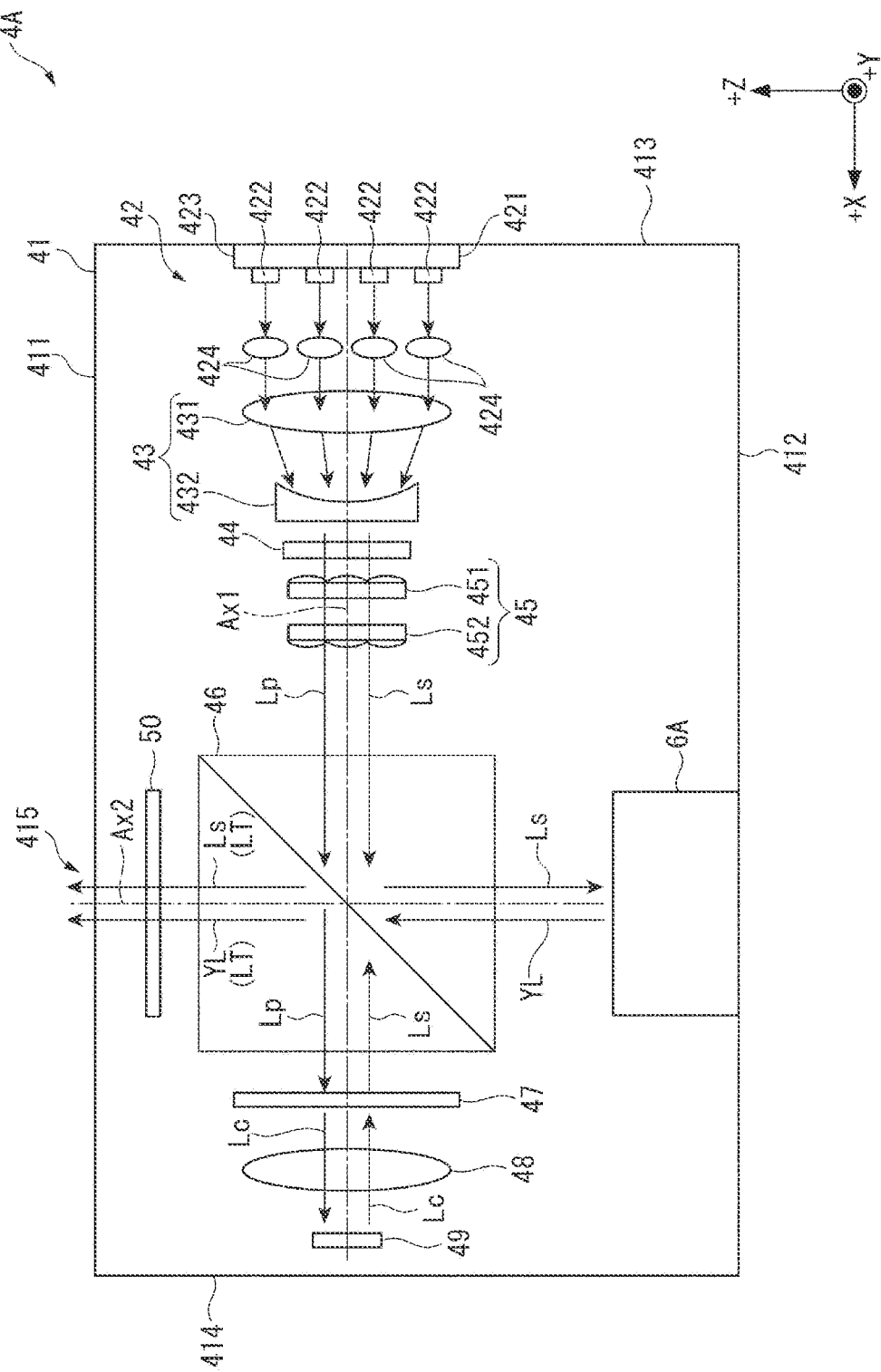
FIG. 2 is a schematic view showing the configuration of a light source device in the first embodiment.

FIG. 2 is a schematic view showing the light source device 4A.

The light source device 4A emits illumination light LT illuminating the light modulator 343, to the homogenization device 31. As shown in FIG. 2, the light source device 4A has a light source casing 41, a light source unit 42 accommodated inside the light source casing 41, an afocal optical element 43, a first phase difference element 44, a homogenizer optical element 45, a light separation element 46, a second phase difference element 47, a condensing element 48, a diffuse reflection element 49, a third phase difference element 50, and a wavelength conversion device 6A.

In the description below, a +X-direction, a +Y-direction, and a +Z-direction are employed as three directions orthogonal to each other. Of the three directions, the +X-direction is the direction in which the light source device 4A emits the illumination light LT. Although not illustrated, the opposite direction of the +X-direction is a −X-direction. The opposite direction of the +Y-direction is a −Y-direction. The opposite direction of the +Z-direction is a −Z-direction.

Configuration of Light Source Casing

The light source casing 41 is a sealed casing which dust or the like does not easily enter, and is formed substantially in the shape of a rectangular parallelepiped. The light source casing 41 has a front face 411, a back face 412, a right side face 413, and a left side face 414. The light source casing 41 also has a top face coupling together the end parts in the +Y-direction of the front face 411, the back face 412, the right side face 413, and the left side face 414, and a bottom face coupling together the end parts in the −Y-direction, though not illustrated.

The front face 411 is a face from which the illumination light LT is emitted, of the light source casing 41. The front face 411 is arranged in the +Z-direction in the light source casing 41. The front face 411 has an exit port 415 through which the illumination light LT is emitted.

The back face 412 is a face opposite to the front face 411 and is arranged in the −Z-direction in relation to the front face 411. The wavelength conversion device 6A is attached to the back face 412.

In the light source casing 41, an illumination optical axis Ax1 along the +X-direction and an illumination optical axis Ax2 along the +Z-direction are set. That is, the illumination optical axis Ax1 and the illumination optical axis Ax2 intersect each other.

The light source unit 42, the afocal optical element 43, the first phase difference element 44, the homogenizer optical element 45, the light separation element 46, the second phase difference element 47, the condensing element 48, and the diffuse reflection element 49 are arranged on the illumination optical axis Ax1.

The wavelength conversion device 6A, the light separation element 46, and the third phase difference element 50 are arranged on the illumination optical axis Ax2. The light separation element 46 is arranged at the part where the illumination optical axis Ax1 and the illumination optical axis Ax2 intersect each other.

Configuration of Light Source Unit

The light source unit 42 has a light source 421 emitting light, and a collimating lens 424.

The light source 421 has a plurality of solid-state light-emitting elements 422 and a light source support member 423.

The solid-state light-emitting element 422 is a solid-state light source emitting s-polarized blue light, which is excitation light. More specifically, the solid-state light-emitting element 422 is a semiconductor laser, and the blue light emitted from the solid-state light-emitting element 422 is, for example, laser light having a peak wavelength of 440 nm. In this case, s-polarized light is s-polarized light to the light separation element 46 and p-polarized light is p-polarized to the light separation element 46.

The light source support member 423 supports the plurality of solid-state light-emitting elements 422 arranged in an array-like form on a plane orthogonal to the illumination optical axis Ax1. The light source support member 423 is a thermally conductive metal member and is attached to the right side face 413 intersecting the illumination optical axis Ax1. Therefore, the heat of the plurality of solid-state light-emitting elements 422 is transferred to the light source casing 41 via the light source support member 423.

The blue light emitted from the plurality of solid-state light-emitting elements 422 is converted into a parallel luminous flux by the collimating lens 424 and enters the afocal optical element 43.

In this embodiment, the light source 421 emits blue light that is linearly polarized light having the same direction of polarization. However, this is not limiting. The light source 421 may be configured to emit s-polarized blue light and p-polarized blue light. In this case, the first phase difference element 44 can be omitted.

Configuration of Afocal Optical Element

The afocal optical element 43 adjusts the diameter of the luminous flux of the blue light incident from the light source unit 42. The afocal optical element 43 is formed of a lens 431 condensing incident light and a lens 432 parallelizing the luminous flux condensed by the lens 431. The afocal optical element 43 may be omitted.

Configuration of First Phase Difference Element

The first phase difference element 44 is provided between the afocal optical element 43 and the homogenizer optical element 45. The first phase difference element 44 converts the incident blue light, which is one type of linearly polarized light, into light including s-polarized blue light Ls and p-polarized blue light Lp. The first phase difference element 44 may be rotationally moved about an axis of rotational movement along the illumination optical axis Ax1 by a rotational movement device. In this case, the proportion of the blue light Ls and the blue light Lp in the luminous flux emitted from the first phase difference element 44 can be adjusted according to the angle of rotational movement of the first phase difference element 44.

Configuration of Homogenizer Optical Element

The homogenizer optical element 45 homogenizes the illuminance distribution of the blue lights Ls, Lp incident via the first phase difference element 44. The homogenizer optical element 45 is formed of a pair of multi-lens arrays 451, 452.

Also, a diffuse transmission element that diffuses the incident light in the course of transmitting the incident light and thus homogenizes the illuminance distribution of the exiting light may be employed instead of the homogenizer optical element 45. The diffuse transmission element can employ, for example, a configuration having a hologram, a configuration where a plurality of small lenses are arrayed on a plane orthogonal to the optical axis, and a configuration where a surface through which the light passes is a rough surface.

Configuration of Light Separation Element

The blue lights Ls, Lp having passed through the homogenizer optical element 45 enter light separation element 46.

The light separation element 46 is a prism-type polarizing beam splitter and separates the s-polarized light component and the p-polarized light component included in the incident light. Specifically, the light separation element 46 reflects the s-polarized light component and transmits the p-polarized light component. Therefore, the blue light Ls, which is the s-polarized light incident in the +X-direction, is reflected into the −Z-direction by the light separation element 46 and enters the wavelength conversion device 6A. Meanwhile, the blue light to, which is the p-polarized light incident in the +X-direction, is transmitted through the light separation element 46 in the +X-direction and enters the second phase difference element 47. The light separation element 46 also has a color separation characteristic of reflecting light with a wavelength shorter than a predetermined wavelength and transmitting light with the predetermined wavelength or longer, for both the s-polarized light component and the p-polarized light component. Therefore, the blue light Ls incident along the −Y-direction from the second phase difference element 47 is reflected into the +Z-direction by the light separation element 46 and enters the third phase difference element 50. Meanwhile, fluorescence YL incident in the +Z-direction from the wavelength conversion device 6A is transmitted through the light separation element 46 in the +Z-direction and enters the third phase difference element 50.

The light separation element 46 may have the function of a half mirror transmitting a part of the light incident from the light source unit 42 via the homogenizer optical element 45 and reflecting the rest of the light, and the function of a dichroic mirror reflecting the blue light incident from the diffuse reflection element 49 and transmitting the fluorescence YL incident from the wavelength conversion device 6A. In this case, the first phase difference element 44 can be omitted.

Configuration of Wavelength Conversion Device

The wavelength conversion device 6A converts first light in a first wavelength band emitted from the light source 421 to second light in a second wavelength band that is different from the first wavelength band. That is, the wavelength conversion device 6A converts the blue light Ls incident in the −Z-direction to the fluorescence YL and emits the fluorescence YL in the +Z-direction. The blue light Ls is equivalent to the first light in the first wavelength band. The fluorescence YL is equivalent to the second light in the second wavelength band that is different from the first wavelength band. More specifically, the wavelength conversion device 6A is excited by the incidence of the blue light Ls as excitation light and emits the fluorescence YL having a longer wavelength than the wavelength of the incident blue light Ls. The fluorescence YL is, for example, light having a peak wavelength of 500 to 700 nm. That is, the fluorescence YL includes green light and red light.

The configuration of the wavelength conversion device 6A will be described fa detail later.

Configuration of Second Phase Difference Element and Condensing Element

The second phase difference element 47 is arranged between the light separation element 46 and the condensing element 48. The second phase difference element 47 converts the blue light Lp having passed through the light separation element 46 to circularly polarized blue light Lc. The blue light Lc enters the condensing element 48.

The condensing element 48 condenses the blue light Lc incident from the second phase difference element 47, onto the diffuse reflection element 49. The condensing element 48 also parallelizes the blue light Lc incident from the diffuse reflection element 49. The number of lenses forming the condensing element 48 can be changed according to need.

Configuration of Diffuse Reflection Element

The diffuse reflection element 49 reflects and diffuses the incident blue light Lc at a diffusion angle similar to that of the fluorescence YL emitted from the wavelength conversion device 6A. For example, the diffuse reflection element 49 reflects the blue light Lc incident in the +X-direction into the −X-direction by Lambertian reflection. The diffuse reflection element 49 may be rotated about a rotation axis parallel to the illumination optical axis Ax1.

The blue light Lc diffuse-reflected by the diffuse reflection element 49 passes through the condensing element 48 and subsequently enters the second phase difference element 47. When reflected by the diffuse reflection element 49, the blue light Lc is converted to circularly polarized light with the direction of rotation reversed. Therefore, the blue light Lc incident on the second phase difference element 47 via the condensing element 48 is converted to s-polarized blue light Ls by the second phase difference element 47. The blue light Ls is reflected by the light separation element 46 and enters the third phase difference element 50. That is, the light incident on the third phase difference element 50 from the light separation element 46 is white light that is a mixture of the blue light Ls and the fluorescence YL.

Configuration of Third Phase Difference Element

The blue light Ls reflected in the +Z-direction by the light separation element 46 and the fluorescence YL having passed through the light separation element 46 in the +Z-direction enter the third phase difference element 50. That is, white light formed of the blue light Ls and the fluorescence YL combined together at the light separation element 46 enters the third phase difference element 50.

The third phase difference element 50 converts the incident white light to light formed of a mixture of s-polarized light and p-polarized light. The white illumination light LT thus converted enters the homogenization device 31.

Configuration of Wavelength Conversion Device

Figure 3:
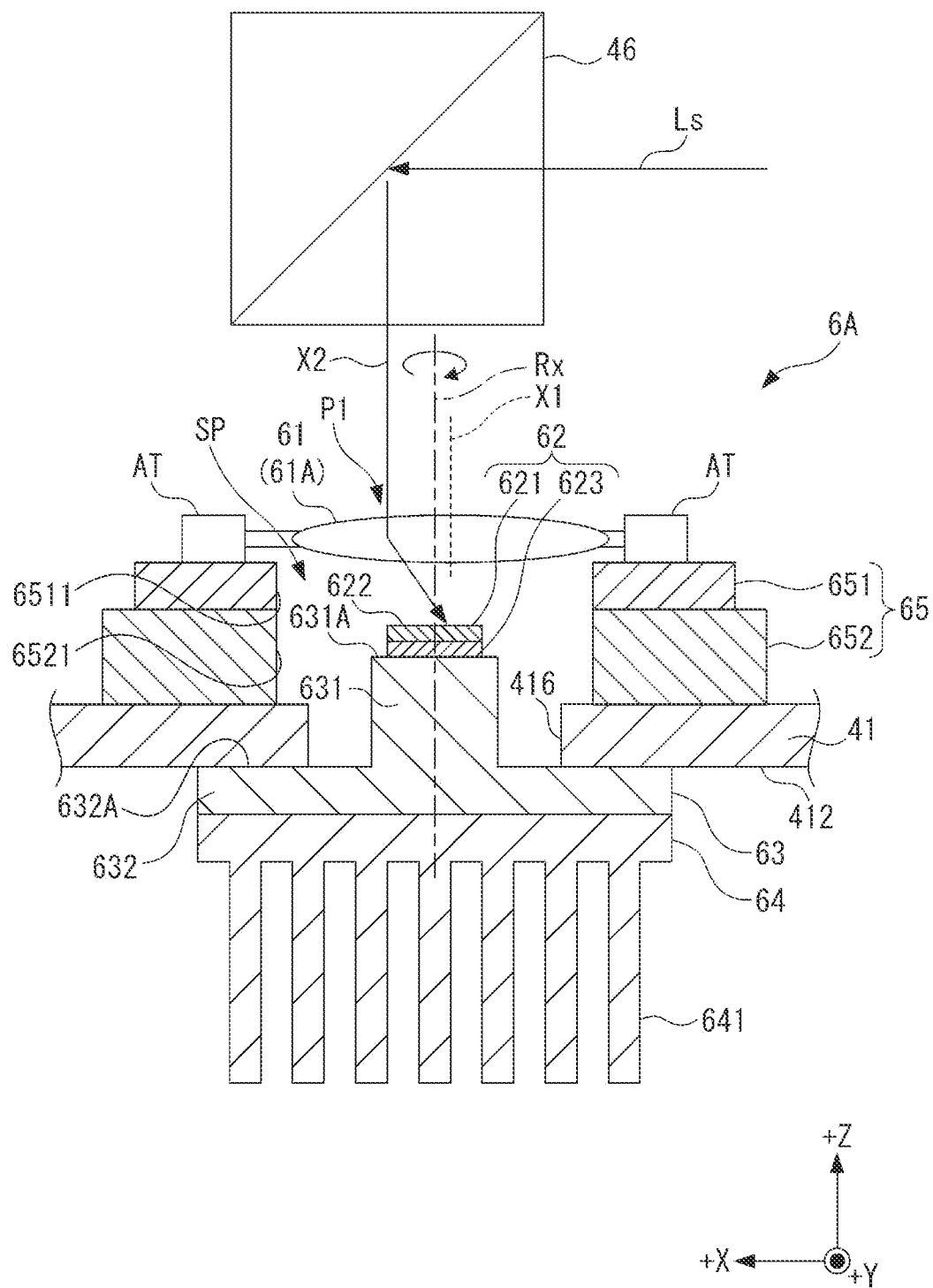
FIG. 3 is a schematic showing the configuration of a wavelength conversion device in the first embodiment.

FIG. 3 is a schematic view showing the configuration of the wavelength conversion device 6A. FIG. 3 shows an example of a beam of the blue light Ls incident on an outer part 21 of an optical element 61.

The wavelength conversion device 6A is a reflection-type wavelength converter that converts the blue light is incident along the −Z-direction to the fluorescence YL and emits the fluorescence YL to the blue light Ls-incident side, as described above. As shown in FIG. 3, the wavelength conversion device GA has the optical element 61, a wavelength converter 62, a coupling member 63, a heat radiation member 64, and a hollow motor 65.

Configuration of Optical Element

The optical element 61 condenses the blue light Ls reflected by the light separation element 46, onto the wavelength converter 62. The optical element 61 also parallelizes the fluorescence YL incident from the wavelength converter 62 and emits the parallelized fluorescence YL to the light separation element 46. In the example shown in FIG. 3, the optical element 61 is formed of one lens. However, any number of lenses may be employed to form the optical element 61. When the optical element 61 is formed of a plurality of lenses, all of the plurality of lenses may be rotated by the hollow motor 65, or at least one lens including the nearest lens to the wavelength converter 62, of the plurality of lenses, may be rotated.

Configuration of Wavelength Converter

The wavelength converter 62 converts the first light in the first wavelength band to the second light in the second wavelength band. That the wavelength converter 62 converts the wavelength of the blue light Ls incident from the optical element 61 and emits the fluorescence YL, which is the converted light. In this embodiment, the wavelength converter 62 is a reflection-type wavelength converter emitting the fluorescence YL to the blue light Ls-incident side.

The wavelength converter 62 has a wavelength conversion layer 621 and a reflection layer 623.

The wavelength conversion layer 621 includes a phosphor generating the fluorescence YL having a longer wavelength than the wavelength of the blue light Ls. The fluorescence YL is, for example, light having a peak wavelength of 500 to 700 nm and includes green light and red light. The fluorescence YL is an example of the second light in the second wavelength band that is different from the first wavelength band. The surface in the +Z-direction of the wavelength conversion layer 621 is a light incident surface 622 on which the blue light Ls is incident. That is, the wavelength converter 62 has the light incident surface 622 on which the blue light Ls is incident.

The light incident surface 622 intersects an optical axis X1 of the optical element 61 and a rotation axis Rx of the optical element 61 by the hollow motor 65. In this embodiment, the rotation axis Rx intersects the center of the light incident surface 622, as viewed from the +Z-direction. The meaning of the rotation axis Rx intersecting the center of the light incident surface 622 includes the case where the rotation axis Rx intersects substantially the center of the light incident surface 622. However, this is not limiting. The rotation axis Rx may intersect any part of the light incident surface 622.

Meanwhile, the position of intersection between the light incident surface 622 and the optical axis X1 of the optical element 61 and the position of intersection between the light incident surface 622 and the rotation axis Rx are spaced apart from each other. That is, the optical axis X1 and the rotation axis Rx are spaced apart from each other on the light incident surface 622. On a surface orthogonal to the optical axis X1 of the optical element 61, the distance between the optical axis X1 and the rotation axis Rx is shorter than the distance between the rotation axis Rx and an optical axis X2 of the blue light Ls emitted from the light separation element 46. However, this is not limiting. It suffices that the optical axis X1, the optical axis X2, and the rotation axis Rx are spaced apart from each other. Either one of the distance between the optical axis X1 and the rotation axis Rx and the distance between the optical axis X2 and the rotation axis Rx may be longer than the other.

In this embodiment, the wavelength conversion layer 621 is formed in a substantially rectangular shape, as viewed from the +Z-direction. However, this is riot limiting. The wavelength conversion layer 621 may be formed in a substantially circular shape or in a ring shape, as viewed from the +Z-direction.

The reflection layer 623 is provided to the opposite side of the wavelength conversion layer 621 from the blue light Ls-incident side. That is, the reflection layer 623 is provided in the −Z-direction in relation to the wavelength conversion layer 621. The reflection layer 623 reflects the light incident from the wavelength conversion layer 621 into the +Z-direction. The reflection layer 623 is a part coupled to the coupling member 63, of the wavelength converter 62.

The fluorescence YL emitted in the +Z-direction from the wavelength converter 62 enters the optical element 61. The fluorescence YL incident on the optical element 61 is parallelized by the optical element 61 and is emitted to the light separation element 46. The fluorescence YL incident on the light separation element 46 passes through the light separation element 46 and enters the third phase difference element 50.

Configuration of Coupling Member

The coupling member 63 is thermally coupled to the wavelength converter 62. The coupling member 63 has a support part 631 supporting the wavelength converter 62, and a coupling part 632 coupled co the back face 412 of the light source casing 41.

The support part 631 is arranged in a hollow space SP provided inside the hollow motor 65. That is, a part of the coupling member 63 is arranged in the hollow space SP. The face in the +direction of the support part 631 is a support face 631A supporting the wavelength converter 62. Specifically, the support face 631A is coupled to the reflection layer 623 of the wavelength converter 62 by a solder or the like. The heat of the wavelength converter 62 is transferred to the support part 631. In this way, the coupling member 63 also functions as a support body supporting the wavelength converter 62.

The coupling part 632 is integrated with the support part 631. A face 632A in the +Z-direction of the coupling part 632 is thermally coupled to the outer surface of the back face 412. In this case, the coupling part 632 is fixed in such a way as to cover an opening 416 provided in the back face 412, from outside the light source casing 41. Therefore, the sealability of the light source casing 41 is secured. The opening 416 is, for example, an opening for arranging the wavelength converter 62 inside the light source casing 41.

Configuration of Heat Radiation Member

The heat radiation member 64 is provided at the opposite side of the coupling part 632 of the coupling member 63 from the wavelength converter 62. That is, the heat radiation member 64 is arranged outside the light source casing 41. The heat radiation member 64 radiates the heat of the wavelength converter 62 transferred from the coupling member 63, at the outside of the light source casing 41. The heat radiation member 64 has a plurality of fins 641. A cooling gas circulated by a cooling device circulates between the plurality of fins 641. The plurality of fins 641 transfer the heat of the wavelength converter 62 to the cooling gas and thus radiate the heat of the wavelength converter 62. As such a heat radiation member 64 is attached to the outer surface of the back face 412, the sealability inside the light source casing 41 is secured.

Configuration of Hollow Motor

The hollow motor 65 changes the position of incidence of the blue light Ls, which is the first light, on the wavelength converter 62, relatively to the wavelength converter 62. Specifically, the hollow motor 65 rotates the optical element 61 about the rotation axis Rx parallel to the optical axis X1 of the optical element 61 and thus changes the position of incidence of the blue light Ls emitted from the optical element 61 and entering the light incident surface 622.

The hollow motor 65 has a rotor part 651, a stator part 652, and a fluid bearing, not illustrated, which is provided between the rotor part 651 and the stator part 652.

The rotor part 651 is an annular part rotating about the rotation axis Rx in the hollow motor 65. The rotor part 651 rotates about the rotation axis Rx. That is, the hollow motor 65 has the rotation axis Rx, and the rotor part 651 has an opening 6511 in a circular shape about the rotation axis Rx, as viewed from the −Z-direction.

The optical element 61 is attached to the rotor part 651 via an attachment member AT. Specifically, the optical element 61 is provided at the face in the +Z-direction of the rotor part 651, that is, at the face intersecting the rotation axis Rx. As the rotor part 651 rotates about the rotation axis Rx relatively to the stator part 652, the optical element 61 rotates about the rotation axis Rx.

The stator part 652 is a part rotating the rotor part 651. The stator part 652 is formed in an annular shape about the rotation axis Rx. That is, the stator part 652 has an opening 6521 in a circular shape about the rotation axis Rx, as viewed from the +Z-direction. The opening 6521 and the opening 6511 communicate with each other, thus providing the hollow space SP inside the hollow motor 65. That is, the hollow motor 65 has the hollow space SP formed by the opening 6511 and the opening 6521.

In this embodiment, the stator part 652 is fixed to the inner surface of the back face 412. However, this is not limiting. The stator part 652 may be fixed to another component.

The hollow motor 65 may be a bearing instead of a fluid bearing.

Effects of Wavelength Conversion Device

When the rotor cart 651 is rotated, the optical element 61 attached to the rotor part 651 rotates about the rotation axis Rx of the hollow motor 65.

The rotation axis Rx of the hollow motor 65 and the optical axis X1 of the optical element 61 do not coincide with each other. That is, the optical element 61 is provided eccentrically in relation to the rotation axis Rx. The optical axis X2 of the blue light Ls incident on the optical element 61 from the light separation element 46 does not change even when the optical element 61 is rotated by the hollow motor 65.

Also, the focal point of the optical element 61 located on the optical axis X1 is not located on the light incident surface 622 of the wavelength converter 62 and is located at the blue light Ls-incident side of the light incident surface 622 or at the opposite side of the light incident surface 622 from the blue light Ls-incident side. In this embodiment, the focal point of the optical element 61 is located at the opposite side of the light incident surface 622 from the blue light Ls-incident side.

Therefore, with a change in the position of incidence of the blue light Ls at a light incident surface 61A on which the blue light Ls is incident, of the optical element 61, the position of incidence of the blue light Ls on the light incident surface 622 of the wavelength converter 62 changes.

For example, as shown in FIG. 3, when the blue light Ls enters the outer part P1 in relation to the optical axis X1 of the optical element 61, the blue light Ls is refracted by the optical element 61 and is condensed to the optical axis X1 side. Since the focal point of the optical element 61 is located at the opposite side of the light incident surface 622 from the blue light Ls-incident side, the blue light Ls enters the opposite side of the rotation axis Rx on the light incident surface 622, as viewed from the +Z-direction. In the example shown in FIG. 3, the blue light Ls incident on the outer part P1 in the +X-direction in relation to the rotation axis Rx, of the optical element 61, enters a part in the −X-direction in relation to the rotation axis Rx, of the light incident surface 622, as viewed from the +Z-direction.

As described above, the wavelength converter 62 is arranged in such a way that the rotation axis Rx intersects the center of the light incident surface 622, as viewed from the +Z-direction.

Figure 4:
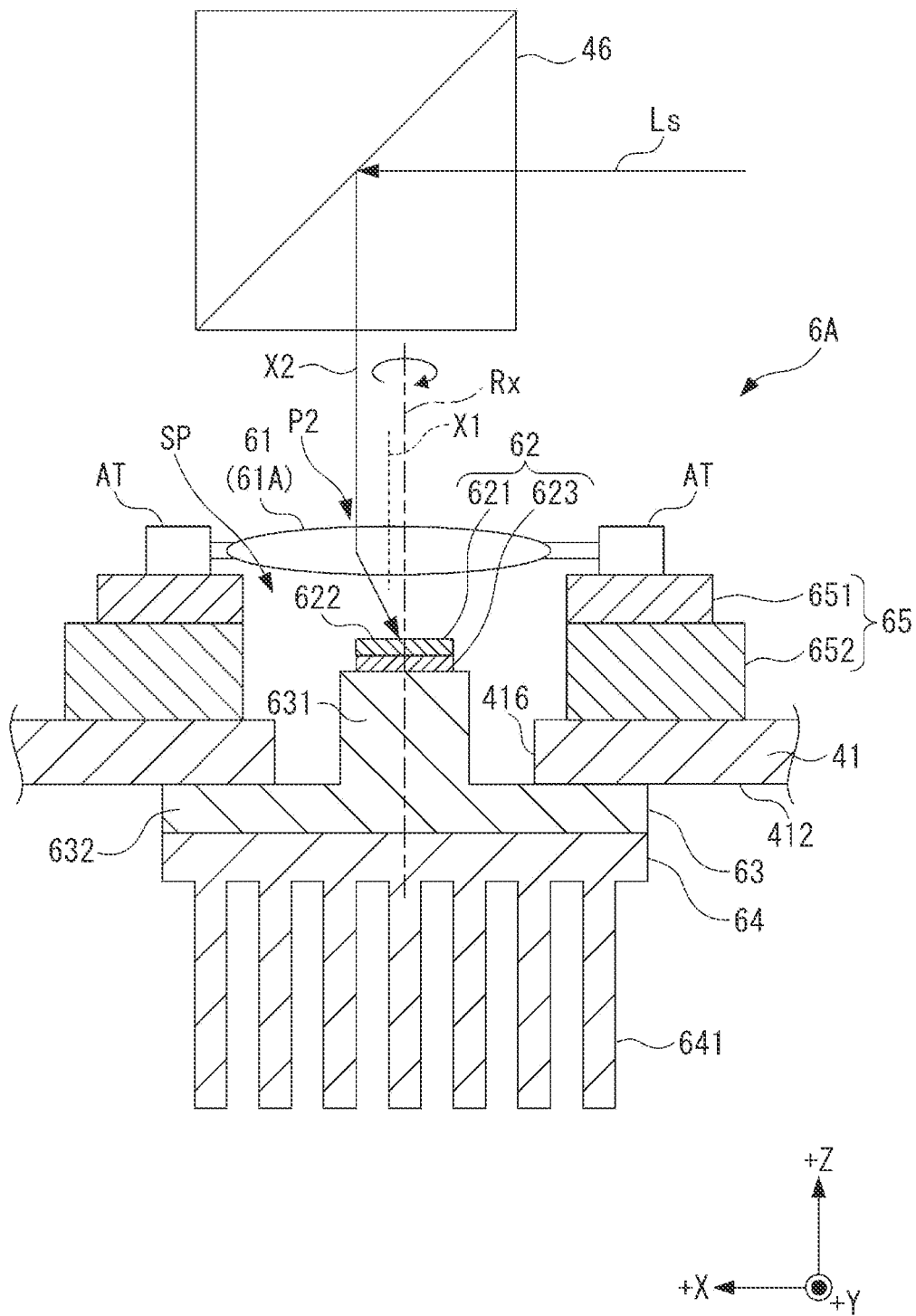
FIG. 4 is a schematic view showing the configuration of the wavelength conversion device in the first embodiment.

FIG. 4 shows an example of a beam of the blue light Ls incident on an inner part P2 closer to the optical axis X1 than the outer part P1 of the optical element 61.

Meanwhile, when the optical element 61 is rotated by the hollow motor 65 and the blue light Ls enters the inner part P2 closer to the optical axis X1 of the optical element 61 than the outer part P1 of the optical element 61, the blue light Ls enters a part in the +X-direction in relation to the rotation axis Rx, of the light incident surface 622, as viewed from the +Z-direction, as shown in FIG. 4.

As the optical element 61 condensing the blue light Ls incident from the light separation element 46 onto the wavelength converter 62 is thus rotated about the rotation axis Rx spaced apart from the optical axis X1 of the optical element 61 by the hollow motor 65, the position of incidence of the blue light Ls on the light incident surface 622 of the wavelength converter 62 can be changed. Specifically, the position of incidence of the blue light Ls on the light incident surface 622 can be moved circularly. Thus, constant and continuous incidence of the blue light Ls on a part of the light incident surface 622 can be restrained and therefore the generation of a site with a locally high temperature in the wavelength converter 62 can be restrained. Therefore, a drop in the efficiency of conversion from the blue light Ls to the fluorescence YL in the wavelength converter 62 can be restrained.

In this embodiment, the relative position between the optical element 61 and the wavelength converter 62 is decided in such a way that the area of the circular shape where the position of incidence of the blue light Ls moves is twice the shape of the focal point of the blue light Ls by the optical element 61 or more, and eight times or less. Also, the amount of eccentricity of the optical element 61 in relation to the rotation axis Rx is 0.5 times the shape of the focal point or more and twice or less. The number of rotations of hollow motor 65 is 500 rpm or more.

However, the area of the circular shape where the position of incidence of the blue light Ls moves, the amount of eccentricity of the optical element 61 in relation to the rotation axis Rx, and the number of rotations of the hollow motor 65 are not limited to the above examples.
Effects of First Embodiment The above-described projector 1 according to this embodiment achieves the effects described below.

The projector 1 has the light source device 4A, the light modulator 343, and the optical projection device 36. The light modulator 343 modulates light emitted from the light source device 4A according to image information. The optical projection device 36 projects the light modulated by the light modulator 343.

The light source device 4A has the wavelength conversion device 6A and the light source 421 emitting the blue light Ls incident on the wavelength conversion device 6A. The blue light Ls is equivalent to the first light in the first wavelength band.

The wavelength conversion device 6A has the wavelength converter 62, the coupling member 63, and the hollow motor 65. The wavelength converter 62 converts the incident blue light Ls to the fluorescence YL. The fluorescence YL is equivalent to the second light in the second wavelength band that is different from the first wavelength band. The coupling member 63 is thermally coupled to the wavelength converter 62. In the hollow motor 65, the rotation axis Rx and the hollow space SP are provided. A part of the coupling member 63 is provided in the hollow space SP. The hollow motor 65 changes the position of incidence of the blue light Ls on the wavelength converter 62 relatively to the wavelength converter 62.

Such a configuration can restrain continuous local incidence of the blue light Ls on the wavelength converter 62. Therefore, the generation of a part with a locally high temperature in the wavelength converter 62 can be restrained and a drop in the efficiency of conversion from the blue light Ls to the fluorescence YL in the wavelength converter 62 can be restrained.

Also, at least a part of the coupling member 63 thermally coupled to the wavelength converter 62 is provided inside the hollow space SP provided in the hollow motor 65. Therefore, a path to transfer the heat of the wavelength converter 62 can be provided inside the hollow space SP. Thus, the wavelength conversion device 6A can be miniaturized, compared with the case where a path to transfer the heat of the wavelength converter 62 is provided outside the hollow motor 65.

The light source device 4A having such a wavelength conversion device 6A can stably emit light. The projector 1 can stably project the light modulated by the light modulator 343, that is, an image.

The wavelength conversion device 6A has the optical element 61 condensing the blue light Ls onto the wavelength converter 62. The optical axis X1 of the optical element 61, the optical axis X2 of the blue light Ls incident on the optical element 61, and the rotation axis Rx are spaced apart from each other on a plane orthogonal to the rotation axis Rx (a plane intersecting the rotation axis Rx). The hollow motor 65 rotates the optical element 61 about the rotation axis Rx.

In such a configuration, when the optical element 61 is rotated by the hollow motor 65, the position of incidence of the blue light Ls on the optical element 61 changes in the radial direction of the optical element 61. Thus, the direction of emission of the blue light Ls from the optical element 61 can be changed and therefore the position of incidence of the blue light Ls on the wavelength converter 62 can be changed. Accordingly, a drop in the efficiency of conversion from the blue light Ls to the fluorescence YL in the wavelength converter 62 can be restrained, as described above.

in the wavelength conversion device 6A, the focal point of the optical element 61 is located at the opposite side of the wavelength converter 62 from the blue light Ls-incident side, on the optical axis X1 of the optical element 61.

In such a configuration, when the optical element 61 is rotated, the position of incidence of the blue light Ls on the wavelength converter 62 with the direction of emission from the optical element 61 changed, can be changed. Thus, a drop in the efficiency of conversion from the blue light Ls to the fluorescence YL in the wavelength converter 62 can be restrained.

In the wavelength conversion device 6A, the hollow motor 65 has the rotor part 651 and the stator part 652 rotating the rotor part 651 about the rotation axis Rx. The optical element 61 is supported by the rotor part 651.

In such a configuration, the optical element 61 can be rotated about the rotation axis Rx of the hollow motor 65. Also, the optical element 61 can be easily arranged in such a way that the optical axis X1 of the optical element 61 and the rotation axis Rx are spaced apart from each other.

Second Embodiment

A second embodiment of the present disclosure will now be described.

A projector according to this embodiment has a configuration similar to that of the projector 1 according to the first embodiment but differs in the configuration of the light source device. In the description below, a part that is the same or substantially the same as an already described part is denoted by the same reference sign and is not described further in detail.

Figure 5:
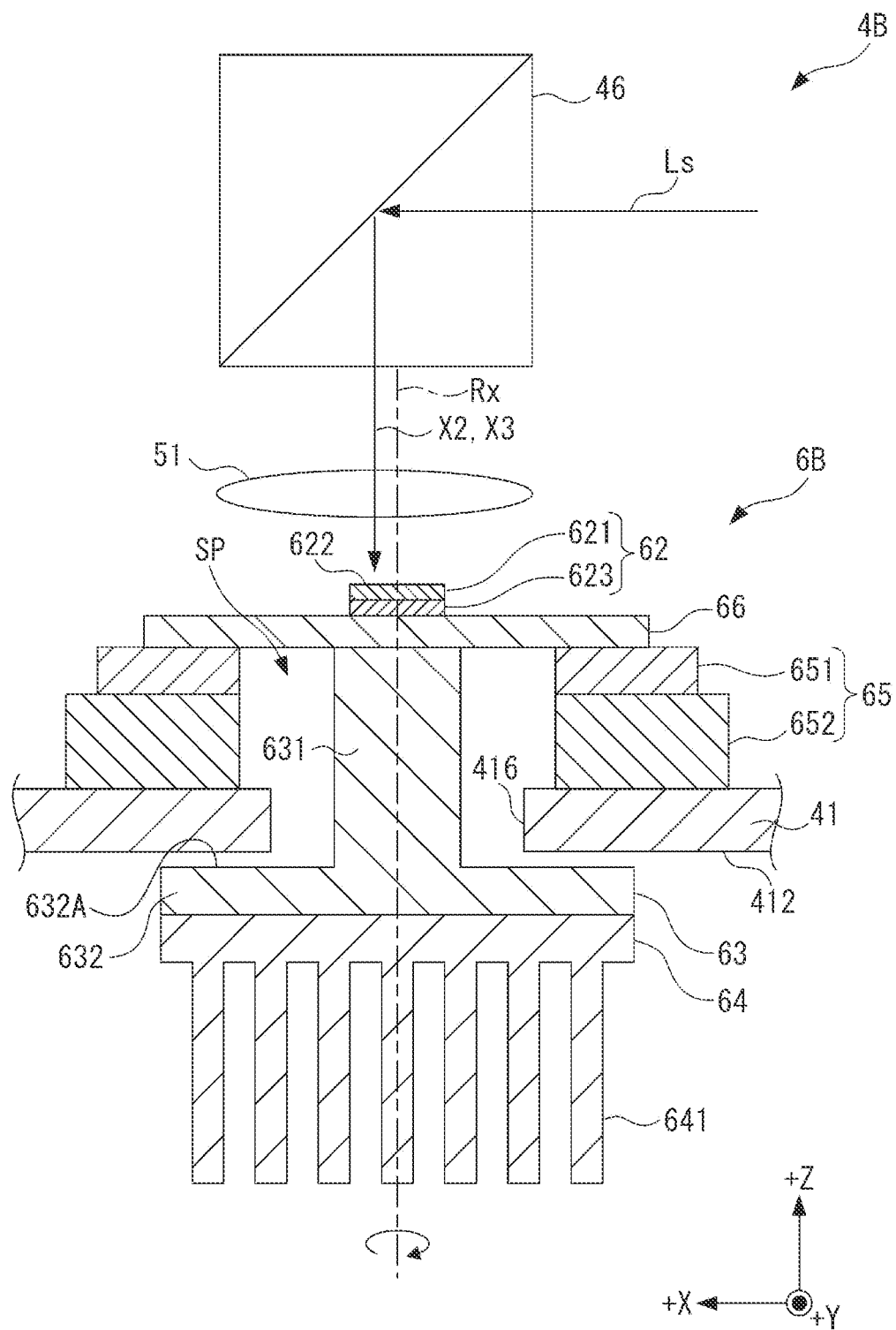
FIG. 5 is a schematic view showing the configuration of a wavelength conversion device of a light source device provided in a projector according to a second embodiment.

FIG. 5 is a schematic view showing a part of the configuration of a light source device 4B provided in the projector according to this embodiment.

The projector according to this embodiment has a configuration and functions similar to those of the projector 1 according to the first embodiment except for having the light source device 4B shown in FIG. 5 instead of the light source device 4A according to the first embodiment.

The light source device 4B has a configuration and functions similar to those of the light source device 4A except for having a condensing element 51 and a wavelength conversion device 6B instead of the wavelength conversion device 6A according to the first embodiment.

Configuration of Condensing Element

The condensing element 51 is arranged between the light separation element 46 and the wavelength conversion device 6B on the illumination optical axis Ax2. Similarly to the optical element 61, the condensing element 51 condenses the blue light Ls, which is the first light incident in the −Z-direction from the light separation element 46, onto the wavelength converter 62. The condensing element 51 also condenses the fluorescence YL emitted in the +Z-direction from the wavelength converter 62 and emits the parallelized fluorescence YL in the direction toward the light separation element 46.

The condensing element 51 is arranged in such a way that an optical axis X3 of the condensing element 51 substantially coincides with the optical axis X2 of the blue light Ls incident from the light separation element 46. The condensing element 51 is also arranged in such a way that the optical axis X3 of the condensing element 51 is spaced apart from the rotation axis Rx of the hollow motor 65 of the wavelength conversion device 6B. That is, the optical axis X3 of the condensing element 51 is spaced apart from the rotation axis Rx on a plane orthogonal to the rotation axis Rx (a plane intersecting the rotation axis Rx). The focal point of the condensing element 51 is located on the light incident surface 622 of the wavelength converter 62, on the optical axis X3.

Configuration of Wavelength Conversion Device

The wavelength conversion device 6B converts the incident blue light Ls to the fluorescence it, similarly to the wavelength conversion device 6A according to the first embodiment. Specifically, the wavelength conversion device 6B converts the blue light Ls incident from the light separation element 46 to the fluorescence YL.

The wavelength conversion device 6B has a configuration and functions similar to those of the wavelength conversion device 6A except for having a substrate 66 instead of the optical element 61 and except that the hollow motor 65 rotates the substrate 66 instead of the optical element 61. That is, the wavelength conversion device 6B has the wavelength converter 62, the coupling member 63, the heat radiation member 64, the hollow motor 65, and the substrate 66.

The substrate 66 is attached to the rotor part 651 of the hollow motor 65, in the state of supporting the wavelength converter 62 at the face in the +Z-direction. In other words, in the wavelength conversion device 6B, the rotor part 651 of the hollow motor 65 supports the wavelength converter 62.

The substrate 66 is formed of a material with good thermal conductivity such as a metal in a plate-like shape and is fixed to the face in the +Z-direction of the rotor part 651. Therefore, when the rotor part 651 is rotated about the rotation axis Rx, the wavelength converter 62 supported by the substrate 66 is rotated about the rotation axis Rx.

The coupling member 63 is coupled to the face in the −Z-direction of the substrate 66. A part of the coupling member 63 is arranged in the hollow space SP. The face 632A in the +Z-direction of the coupling part 632 of the coupling member 63 is spaced apart from the back face 412 the −Z-direction. The coupling member 63 is coupled to the heat radiation member 64 provided outside the hollow motor 65. Therefore, when the rotor part 651 as rotated, the wavelength converter 62 supported by the substrate 66, and the coupling member 63 and the heat radiation member 64 coupled to the substrate 66, are rotated about the rotation axis Rx in a unified manner.

Since the coupling member 63 is rotated by the hollow motor 65, there is a gap between the back face 412 and the face 632A facing the back face 412, of the coupling member 63. This gap communicates with the hollow space SP via the opening 416. Therefore, in the light source device 4B, the sealability of the light source casing 41 is secured by the fluid bearing or the bearing between the rotor part 651 and the stator part 652.

In this embodiment, the rotation axis Rx of the hollow motor 65 intersects the center of the light incident surface 622, as viewed from the blue light Ls-incident side, that is, as viewed from the +Z-direction. The meaning of the rotation axis Rx intersecting the center of the light incident surface 622 includes the case where the rotation axis Rx intersects substantially the center of the light incident surface 622.

The light incident surface 622 also intersects the optical axis X3 of the condensing element 51.

Effects of Wavelength Conversion Device

When the rotor part 651 is rotated, the wavelength converter 62 supported by the substrate 66 attached to the rotor part 651 rotates about the rotation axis Rx.

In this example, the rotation axis Rx does not coincide with the optical axis X2 of the blue light Ls incident on the condensing element 51 and the optical axis X3 of the condensing element 51. In other words, the rotation axis Rn is eccentric from the optical axes X2, X3. The optical axis X2 of the blue light Ls and the optical axis X3 of the condensing element 51 substantially coincide with each other. That is, the focal point of the condensing element 51 is located on the light incident surface 622 on the optical axes X2, X3, which do not coincide with the rotation axis Rx. The optical axis X2 of the blue light Ls does not change even when the wavelength converter 62 is rotated by the hollow motor 65.

Therefore, when the wavelength converter 62 is rotated, the position of incidence of the blue light Ls on the light incident surface 622 changes. Specifically, when the wavelength converter 62 is rotated, the position of incidence of the blue light Ls on the light incident surface 622 continuously moves with time in a circumferential direction about the rotation axis Rx. The trajectory of the position of incidence of the blue light Ls is a ring-shape about the position of intersection with the rotation axis Rx on the light incident surface 622.

As the wavelength converter 62 is thus rotated about the rotation axis Rx by the hollow motor 65, the position of incidence of the blue light Ls on the light incident surface 622 can be changed. Thus, constant and continuous incidence of the blue light Ls on a part of the light incident surface 622 can be restrained and therefore the generation of a part with a locally high temperature in the wavelength converter 62 can be restrained. Therefore, a drop in the efficiency of conversion from the blue light Ls to the fluorescence YL in the wavelength converter 62 can be restrained.

Since the wavelength converter 62 is provided outside the hollow space SP, incidence on the hollow motor 65 of the Fluorescence YL emitted from the side face intersecting the light incident surface 622, of the wavelength converter 62, can be restrained. Thus, a temperature rise in the hollow motor 65 can be restrained.

Effects of Second Embodiment

The above-described projector according to this embodiment achieves the effects described below, in addition to effects similar to those of the projector 1 according to the first embodiment.

In the wavelength conversion device 6B, the optical axis X2 of the blue light Ls incident on the wavelength converter 62 is spaced apart from the rotation axis Rx on a plane orthogonal to the rotation axis Rx (a plane intersecting the rotation axis Rx). The hollow motor 65 rotates the wavelength converter 62 about the rotation axis Rx.

In such a configuration, since the optical axis X2 of the blue light Is incident on the wavelength converter 62 is spaced apart from the rotation axis Rx, the position of incidence of the blue light Ls on the wavelength converter 62 continuously changes about the rotation axis Rx when the wavelength converter 62 is rotated by the hollow motor 65. That is, the position of incidence of the blue light Ls on the wavelength converter 62 continuously changes with time in a circumferential direction about the rotation axis Rx. Thus, the generation of a part with a locally high temperature in the wavelength converter 62 can be restrained and a drop in the efficiency of conversion from the blue light Ls to the fluorescence YL in the wavelength converter 62 can be restrained.

The wavelength conversion device 6B has the heat radiation member 64 thermally coupled to the coupling member 63. The heat radiation member 64 is rotated with the wavelength converter 62 by the hollow motor 65. The heat radiation member 64 is provided outside the hollow motor 65.

In such a configuration, the heat of the wavelength converter 62 can be transferred to the heat radiation member 64 via the coupling member 63. Since the heat radiation member 64 is provided outside the hollow motor 65, the heat of the wavelength converter 62 can be radiated outside the hollow motor 65. Also, since the heat radiation member 64 is rotated with the wavelength converter 62 by the hollow motor 65, the radiation of the heat of the wavelength converter 62 by the heat radiation member 64 can be facilitated. Thus, the wavelength converter 62 can be cooled effectively.

The wavelength conversion device 6B has the substrate 66 supporting the wavelength converter 62. The hollow motor 65 has the rotor part 651 and the stator part 652 rotating the rotor part 651 about the rotation axis Rx. The substrate 66 is supported by the rotor part 651.

In such a configuration, the wavelength converter 62 can be rotated about the rotation axis Rx.

Third Embodiment

A third embodiment of the present disclosure will now be described.

A projector according to this embodiment has a configuration similar to that of the projector according to the second embodiment but differs from the projector according to the second embodiment in the configuration of the wavelength conversion device forming the light source device. In the description below, a part that is the same or substantially the same as an already described part is denoted by the same reference sign and is not described further in detail.

Figure 6:
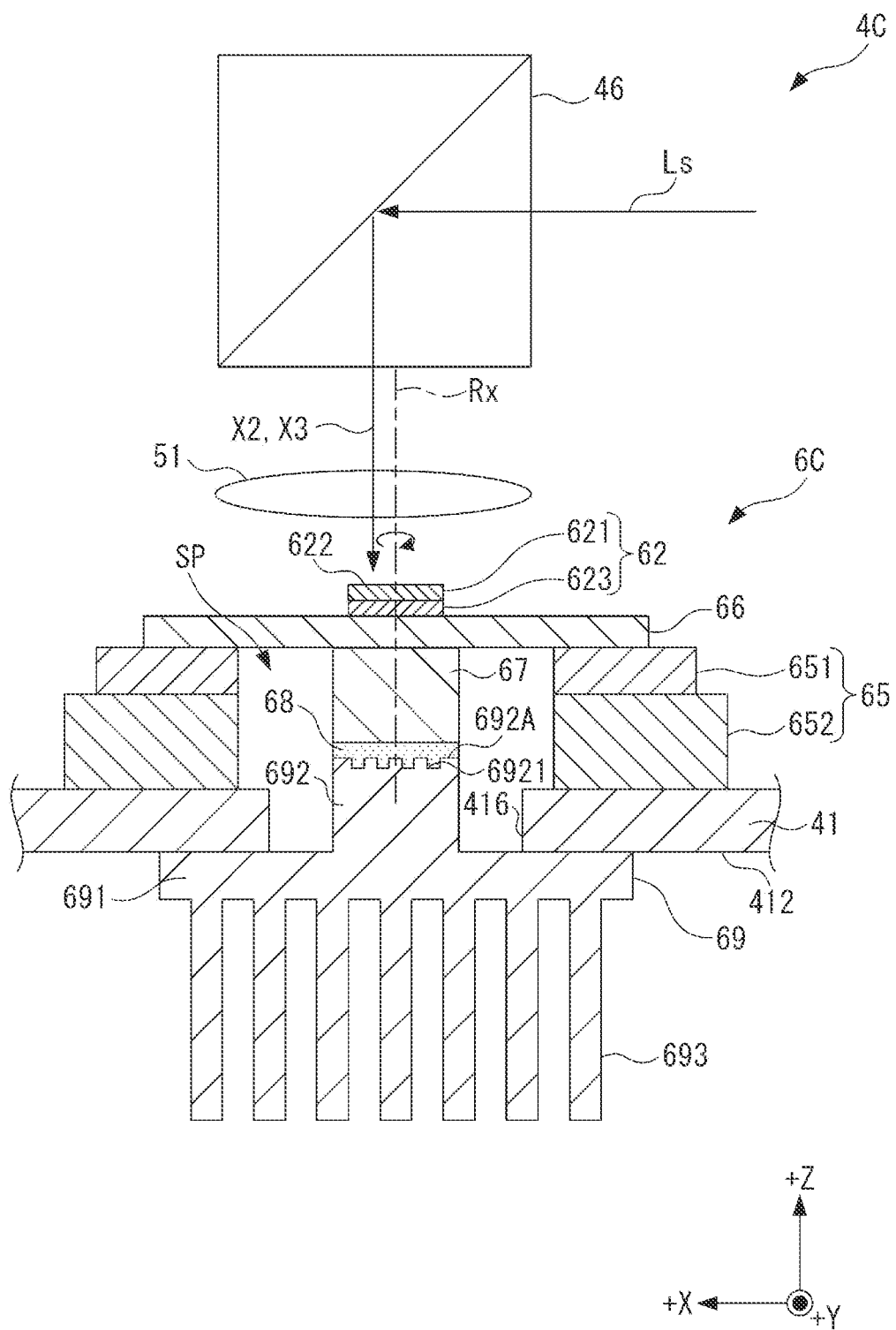

FIG. 6 is a schematic view showing a part of the configuration of a light source device 4C provided in the projector according to this embodiment.

The projector according to this embodiment has a configuration and functions similar to those of the projector according to the second embodiment except for having the light source device 4C shown in FIG. 6 instead of the light source device 4B according to the second embodiment.

The light source device 4C has a configuration and functions similar to those of the light source device 4B except for having a wavelength conversion device 6C instead of the wavelength conversion device 6B according to the second embodiment.

Configuration of Wavelength Conversion Device

The wavelength conversion device 6C converts the incident blue light Ls to the fluorescence YL, similarly to the wavelength conversion devices 6A, 6B according to the first and second embodiments. Specifically, the wavelength conversion device 6C converts the blue light Ls incident from the light separation element 46 to the fluorescence YL.

The wavelength conversion device 6C has a configuration and functions similar to those of the wavelength conversion device 6B except for having a coupling member 67, a heat transfer member 68, and a heat radiation member 69, instead of the coupling member 63 and the heat radiation member 64. That is, the wavelength conversion device 6C has the wavelength converter 62, the hollow motor 65, the substrate 66, the coupling member 67, the heat transfer member 68, and the heat radiation member 69.

The coupling member 67 is arranged in the hollow space SP provided inside the hollow motor 65 The coupling member 67 is coupled to the face in the –Z-direction of the substrate 66, similarly to the coupling member 63 That is, the coupling member 67 is rotated about the rotation axis Rx along with the wavelength converter 62 and the substrate 66 by the hollow motor 65 The coupling member 67 is thermally coupled to the heat radiation member 69. Specifically, the coupling member 67 is coupled to the heat radiation member 69 via the heat transfer member 68. The substrate 66 is coupled to the wavelength conversion layer 621, which rises in temperature, via the reflection layer 623. The wavelength conversion layer 621, when formed of a ceramic, has a coefficient of linear expansion of $1 \times 10^{-6}$ or lower. Therefore, a sintered compact of sliver-molybdenum, copper-molybdenum, diamond-copper or the like having a high thermal conductivity and a low coefficient of linear expansion can be used as the substrate 66.

The coupling member 67 transfers the heat transferred thereto from the wavelength converter 62 via the substrate 66, to the heat radiation member 69 via the heat transfer member 68.

The heat transfer member 68 transfers the heat transferred thereto from the coupling member 67, to the heat radiation member 69. The heat transfer member 68 is configured to be able to transfer the heat to the heat radiation member 69 fixed to the light source casing 41 even when the coupling member 67 is rotated. In this embodiment, the heat transfer member 68 is formed of a thermally conductive grease.

The heat radiation member 69 radiates the heat of the wavelength converter 62 transferred from the heat transfer member 68. The heat radiation member 69 has a fixing part 691, a heat transfer part 692, and a plurality of fins 693.

The fixing part 691 is a part fixing the heat radiation member 69 to the light source casing 41. The fixing part 691 is fixed in such a way that the face in the +Z-direction of the fixing part 691 is thermally coupled to the outer surface of the back face 412 and in such a way as to close the opening 416 at the outside of the light source casing 41.

The heat transfer part 692 protrudes substantially cylindrically from the face in the +Z-direction of the fixing part 691. The heat transfer part 692 is thermally coupled to the coupling member 67 via the heat transfer member 68. That is, the heat of the wavelength converter 62 is transferred to the heat transfer part 692 via the substrate 66, the coupling member 67, and the heat transfer member 68. In this embodiment, a gap of 1 μm or larger and 5 μm or smaller is provided in the +Z-direction between the coupling member 67 and the heat transfer part 692, and the heat transfer member 68 is installed between the coupling member 67 and the heat transfer part 692. As the heat transfer member 68, for example, a thermally conductive grease such as silicone oil that has a thermal conductivity of 0.1 W/mK or higher and a high viscosity and that evaporates in as small an amount as possible at 150° C. or below, is selected.

At a face 692A in the +Z-direction of the heat transfer part 692, a plurality of very smell recesses 6921 are provided. The recesses 6921 form a spiral in such a direction that the heat transfer member 68 moves axially inward when the coupling member 67 is rotated. The depth of the recesses 6921 is 2 μm. The recesses 6921 can be formed by plating the coupling member 67, then performing surface grinding, and subsequently cutting and etching or the like. The recesses 6921 thus hold the heat transfer member 68. In this way, the state where the heat transfer member 68 is held between the coupling member 67 and the heat transfer part 692 can be maintained. Also, recesses similar to the recesses 6921 may be provided at the face opposite to the face 692A, of the coupling member 67. Moreover, a sealing part that restrains leakage and scattering of the heat transfer member 68 may be provided at least at one of the coupling member 67 and the heat transfer part 692. For example, an O-ring may be provided at an outer circumferential part of the heat transfer member 68.

The plurality of fins 693 protrude from the face in the −Z-direction of the fixing part 691. The plurality of fins 693 are arranged outside the light source casing 41 and radiate the heat of the wavelength converter 62 transferred to the heat transfer part 692, outside the light source casing 41.

Effects of Wavelength Conversion Device

In the wavelength conversion device 6C, as the wavelength converter 62 is rotated about the rotation axis Rx by the hollow motor 65, the position of incidence of the blue light Ls on the light incident surface 622 can be continuously changed with time, as in the wavelength conversion device 6B according to the second embodiment. Thus, constant and continuous incidence of the blue light Ls on a part of the light incident surface 622 can be restrained and therefore the generation of a part with a locally high temperature in the wavelength converter 62 can be restrained. Therefore, a drop in the efficiency of conversion from the blue light Ls to the fluorescence YL in the wavelength converter 62 can be restrained.

In the wavelength conversion device 6C, the components to be rotated by the hollow motor 65 are the wavelength converter 62, the substrate 66, and the coupling member 67. That is, in the wavelength conversion device 6C, the hollow motor 65 does not rotate the heat radiation member 69 having a relatively large dimension and a heavy weight. Thus, the weight of the components to be rotated by the hollow motor 65 can be reduced and the rotation load on the hollow motor 65 can be reduced. Therefore, a small-sized hollow motor with a small torque can be employed as the hollow motor 65 and the wavelength conversion device 6C can be configured in a small size. Thus, the light source device 4C and hence the projector can be miniaturized.

Effects of Third Embodiment

The above-described projector according to this embodiment achieves the effects described below, in addition to effects similar to those of the projector according to the second embodiment.

The wavelength conversion device 6C has the heat radiation member 69 thermally coupled to the coupling member 67, and the heat transfer member 68 provided between the coupling member 67 and the heat radiation member 69. A part of the heat radiation member 69 is provided outside the hollow motor 65. The other part of the heat radiation member 69 is arranged inside the hollow space SP.

In such a configuration, the heat generated in the wavelength converter 62 can be transferred to the heat radiation member 69 partly arranged outside the hollow motor 65, via the coupling member 67 and the heat transfer member 68. Since the heat of the wavelength converter 62 can be radiated outside the hollow motor 65, the wavelength converter 62 can be cooled effectively.

In the wavelength conversion device 6C, the heat transfer member 68 is a thermally conductive grease.

In such a configuration, even when the heat radiation member 69 is fixed, the heat of the wavelength converter 62 can be transferred to the heat radiation member 69 from the coupling member 67 rotating with the wavelength converter 62, via the heat transfer member 68. Therefore, the heat of the wavelength converter 62 can be efficiently transferred to the heat radiation member 69.

In the wavelength conversion device 6C, the heat radiation member 69 has the recesses 6921, which are provided at the face 692A facing the coupling member 67 and hold the heat transfer member 68.

In such a configuration, the state where the heat transfer member 68 is held between the coupling member 67 and the heat radiation member 69 can be maintained. Thus, the thermally coupled state between the coupling member 67 and the heat radiation member 69 can be maintained.

Fourth Embodiment

A fourth embodiment of the present disclosure will now be described.

A projector according to this embodiment has a configuration similar to that of the projector according to the third embodiment but differs in the arrangement of the substrate 66. In the description below, a part that is the same or substantially the same as an already described part is denoted by the same reference sign and is not described further in detail.

FIG. 7 is a schematic view showing a part of the configuration of a light source device 4D provided in the projector according to this embodiment.

The projector according to this embodiment has a configuration and functions similar to those of the projector according to the third embodiment except for having the light source device 4D shown in FIG. 7 instead of the light source device 4C according to the third embodiment.

The light source device 4D has a configuration and functions similar to those of the light source device 4B or the light source device 4C except for having a wavelength conversion device 6D instead of the wavelength conversion device 6B according to the second embodiment or the wavelength conversion device 6C according to the third embodiment.

The wavelength conversion device 6D converts the incident blue light Ls to the fluorescence YL, similarly to the wavelength conversion devices 6A, 6B, 6C. Specifically, the wavelength conversion device 6D converts the blue light Ls incident from the light separation element 46 to the fluorescence YL. The wavelength conversion device 6D has the wavelength converter 62, the hollow motor 65, the substrate 66, the coupling member 67, the heat transfer member 68, and the heat radiation member 69, similarly to the wavelength conversion device 6C.

In the wavelength conversion device 6C, the substrate 66 supporting the wavelength converter 62 is provided at the face in the +Z-direction of the rotor part 651 of the hollow motor 65.

Meanwhile, in the wavelength conversion device 6D, the substrate 66 is arranged inside the opening 6511 in the rotor part 651. Specifically, in the wavelength conversion device 6D, the substrate 66 is circularly formed as viewed from the +Z-direction and is arranged inside the opening 6511 in such a way that the end surface of the substrate 66 along the circumferential direction about the rotation axis Rx is coupled to the inner edge of the opening 6511.

Therefore, the wavelength conversion device 6D can be reduced in dimension along the +Z-direction.

The above-described projector according to this embodiment achieves effects similar to those of the projector according to the third embodiment.

Also, In the wavelength conversion device 6A according to the first embodiment, the optical element 61 may be arranged inside the opening 6511, as in the wavelength conversion device 6D. In this case, the optical element 61 may be fixed to the inner edge of the opening 6511 via the attachment member AT or the like.

Also, in the wavelength conversion device 6B according to the second embodiment, the substrate 66 may be arranged inside the opening 6511. In this case, the end surface of the substrate 66 along the circumferential direction about the rotation axis Rx may be fixed to the inner edge of the opening 6511.

Modifications of Embodiments

The present disclosure is not limited to the foregoing embodiments. Modifications and improvements or the like within a range that can achieve the objective of the present disclosure is included in the present disclosure.

In the first embodiment, the hollow motor 65 rotates the optical element 61 condensing the incident first light onto the wavelength converter 62. In the second to fourth embodiments, the hollow motor 65 rotates the wavelength converter 62 and the substrate 66. However, these are not limiting. The component to be rotated by the hollow motor 65 may be another optical component than the optical element 61 and the wavelength converter 62, provided that the position of incidence of the blue light Ls as the first light on The wavelength converter 62 can be changed.

In the first embodiment, the focal point of the optical element 61 is located on the optical axis X1 of the optical element 61 and at the opposite side or the wavelength converter 62 from the blue light Ls-incident side. However, this is not limiting. The focal point of the optical element 61 may be located on the optical axis X1 of the optical element 61 and at the blue light Ls-incident side of the wavelength converter 62 or at the wavelength converter 62.

In the first and second embodiments, the wavelength conversion device 6A, 6B has the heat radiation member 64 thermally coupled to the coupling member 63. The heat radiation member 64 as provided outside the hollow motor 65. However, this is not limiting. A part of the heat radiation member 64 may be provided in the hollow space SP provided inside the hollow motor 65. Also, the entirety of the heat radiation member 64 may be provided in the hollow space SP. The wavelength conversion devices 6A, 6B may not have a heat radiation member. In this case, the coupling member 63 may have a plurality of fins. That is, the coupling member 63 and the heat radiation member 64 may be formed as a unified component.

In the second to fourth embodiments, the substrate 66 supported by the rotor part 651 supports the wavelength converter 62, and the substrate 66 and the coupling members 63, 67 are thermally coupled together. However, this is not limiting. The substrate 66 and the coupling members 63, 67 may be unified together.

In the third and fourth embodiments, the wavelength conversion device 6C, 6D has the heat radiation member 69 thermally coupled to the coupling member 67, and the heat transfer member 68 provided between the coupling member 67 and the heat radiation member 69. A part of the heat radiation member 69 is provided inside the hollow space SP in the hollow motor 65, and the other part of the heat radiation member 69 is Provided outside the hollow motor 65. However, this is not limiting. The entirety of the heat radiation member 69 may be provided inside the hollow space SP in the hollow motor 65. Alternatively, the entirety of the heat radiation member 69 may be provided outside the hollow space SP. Also, the wavelength conversion device 6C, 6D may not have a heat radiation member. In this case, the coupling member 67 may have a plurality of fins. That is, the coupling member 67 and the heat radiation member 69 may be unified together. In this case, the plurality of fins may be arranged outside the hollow motor 65.

In the third and fourth embodiments, the heat transfer member 68 is a thermally conductive grease provided between the coupling member 67 and the heat radiation member 69. However, this is not limiting. The heat transfer member 68 may be a thermally conductive fluid. That is, the heat transfer member 68 may be formed of any other material that can thermally couple the coupling member 67 and the heat radiation member 69 together. Also, the heat transfer member 68 may be omitted, provided that the thermally coupled state between the coupling member 67 and the heat radiation member 69 can be maintained.

In the third and fourth embodiments, the plurality of recesses 6921 holding the heat transfer member 68 are provided at the face 692A facing the coupling member 67, of the heat radiation member 69. However, this is not limiting. The number of recesses 6921 may be any number equal so or greater than 1. The shape of the recesses 6921 as viewed from the +Z-direction may be, for example, spiral. The recesses 6921 may not be provided at the face 692A. Also, recesses similar so the recesses 6921 may be provided at the face facing the face 692A, of the coupling member 67, as described above.

In the second to fourth embodiments, the rotation axis Rx of the hollow motor 65 intersects the center of the light incident surface 622, on which the blue light Ls is incident, of the wavelength converter 62, as viewed from the blue light Ls-incident side, the blue light Ls being the first light. However, this is not limiting. The rotation axis Rx may intersect a part that is not the center of the light incident surface 622.

In the embodiments, the wavelength converter 62 has the wavelength conversion layer 621 and the reflection layer 623. However, this is riot limiting. The wavelength converter 62 may not have the reflection layer 623. In this case, the coupling member 63 or the substrate 66 coupled to the wavelength converter 62 may have a reflection layer.

The wavelength conversion devices 6A, 6B, 6C, 6D are reflection-type wavelength conversion devices in which the wavelength. converter 62 emits the fluorescence YL to the side opposite to the blue light Ls-incident side. However, this is not limiting. The wavelength conversion device according to the present disclosure may be a transmission-type wavelength conversion device emitting the second light along the direction of incidence of the first light.

In the embodiments, the projector has three light modulators 343 (343R, 343G, 343B). However, this is not limiting. The present disclosure is also applicable to a projector having two or fewer light modulators or four or more light modulators.

In the embodiments, the image projection device 3 is described as having the configuration and layout shown in FIG. 1. However, this is not limiting. The configuration and layout of the image projection device 3 are not limited to those described above. The same can be said of the light source device 4A shown in FIG. 2 and the light source devices 4B, 4C, 4D having a configuration similar to that of the light source device 4A.

In the embodiments, the light modulator 343 has a transmission-type liquid crystal panel where the light incident surface and the light exiting surface are different from each other. However, this is not limiting. The light modulator 343 may have a reflection-type liquid crystal panel where the light incident surface and the light exiting surface are the same. Also, a light modulator that does not use liquid crystal, such as a device using a micromirror, for example, a device using a DMD (digital micromirror device), may be employed, provided that the light modulator can modulate an incident luminous flux to form an image according to image information.

In the embodiments, the examples where the light source devices 4A, 4B, 4C, 4D according to the present disclosure are applied to a projector are described. However, these examples are not limiting. The light source device according to the present disclosure may also be employed, for example, for an illumination device or an automobile headlamp or the like.

An the embodiments, the examples where the wavelength conversion devices 6A, 6B, 60, 6D are applied to a light source device are described. However, these examples are not limiting. The wavelength converter according to the present disclosure may also be employed for other devices than the light source device.

Overview of Present Disclosure

An overview of the present disclosure is given below.

According to a first aspect of the present disclosure, a wavelength conversion device includes: a hollow motor having a rotation axis and a hollow space; a wavelength converter converting incident first light in a first wavelength band to second light in a second wavelength band that is different from the first wavelength band; and a coupling member thermally coupled to the wavelength converter. At least a part of the coupling member is arranged in the hollow space. The hollow motor changes a position of incidence of the first light on the wavelength converter relatively to the wavelength converter.

In such a configuration, the position of incidence of the first light on the wavelength converter is changed relatively to the wavelength converter by the hollow motor. Thus, continuous local incidence of the first light on the wavelength converter can be restrained. Therefore, the generation of a part with a locally high temperature in the wavelength converter can be restrained and a drop in the efficiency of conversion from the first light to the second light in the wavelength converter can be restrained.

Since at least a part of the coupling member thermally coupled to the wavelength converter is provided inside the hollow space provided in the hollow motor, a path to transfer the heat of the wavelength converter can be provided inside the hollow space. Therefore, the wavelength conversion device can be miniaturized, compared with the case where a path to transfer the heat of the wavelength converter is provided outside the hollow motor.

According to the first aspect, the wavelength conversion device may include an optical element condensing the first light onto the wavelength converter. An optical axis of the optical element, an optical axis of the first light incident on the optical element, and the rotation axis may be spaced apart from each other on a plane orthogonal to the rotation axis. The hollow motor may rotate the optical element about the rotation axis.

In such a configuration, the optical axis of the optical element, the optical axis of the light incident on the optical element, and the rotation axis of the optical element by the hollow motor are spaced apart from each other. Therefore, when the optical element is rotated by the hollow motor, the position of incidence of the first light on the optical element changes in a direction intersecting the optical axis of the first light incident on the optical element. Thus, the direction of emission of the first light from the optical element can be changed and therefore the position of incidence of the first light on the wavelength converter can be changed. Accordingly, a drop in the efficiency of conversion from the first light to the second light in the wavelength converter can be restrained.

According to the first aspect, the hollow motor may have a rotor part and a stator part rotating the rotor part about the rotation axis. The optical element may be supported by the rotor part.

In such a configuration, the optical element can be rotated about the rotation axis of the hollow motor. Also, the optical element can be easily arranged in such a way that the optical axis of the optical element and the rotation axis are spaced apart from each other.

According to the first aspect, the optical axis of the first light incident on the wavelength converter may be spaced apart from the rotation axis on a plane intersecting the rotation axis. The hollow motor may rotate the wavelength converter about the rotation axis.

In such a configuration, the optical axis of the first light incident on the wavelength converter is spaced apart from the rotation axis. Therefore, when the wavelength converter is rotated by the hollow motor, the position of incidence of the first light on the wavelength converter continuously changes with time in a circumferential direction about the rotation axis. That is, the position of incidence of the first light on the wavelength converter continuously changes with time about the rotation axis. Therefore, the generation of a part with a locally high temperature in the wavelength converter can be restrained and a drop in the efficiency of conversion from the first light to the second light in the wavelength converter can be restrained.

According to the first aspect, the wavelength conversion device may include a heat radiation member thermally coupled to the coupling member. The heat radiation member may be rotated with the wavelength converter by the hollow motor. At least a part of the heat radiation member may be provided outside the hollow motor.

In such a configuration, the heat of the wavelength converter can be transferred to the heat radiation member via the coupling member. Since at least a part of the heat radiation member is provided outside the hollow motor, the heat of the wavelength converter can be radiated outside the hollow motor. Also, since the heat radiation member is rotated with the wavelength converter by the hollow motor, the radiation of the heat of the wavelength converter by the heat radiation member can be facilitated. Thus, the wavelength converter can be cooled effectively.

According to the first aspect, the wavelength conversion device may include a heat radiation member thermally coupled to the coupling member, and a heat transfer member provided between the coupling member and the heat radiation member. At least a part of the heat radiation member may be provided outside the hollow motor.

In such a configuration, the heat generated in the wavelength converter can be transferred to the heat radiation member provided at least partly outside the hollow motor, via the coupling member and the heat transfer member. Thus, the heat of the wavelength converter can be radiated outside the hollow motor. Therefore, the wavelength converter can be cooled effectively.

According to the first aspect, the heat transfer member may be a thermally conductive grease.

In such a configuration, the heat of the wavelength converter can be transferred from the coupling member to the heat radiation member via the heat transfer member even when the heat radiation member it fixed. Thus, the heat of the wavelength converter can be efficiently transferred to the heat radiation member.

According to the first aspect, the heat radiation member may have a recess that is provided at a face facing the coupling member and that holds the heat transfer member.

In such a configuration, the state where the heat transfer member is held between the coupling member and the heat radiation member can be maintained. Thus, the thermally coupled state between the coupling member and the heat radiation member can be maintained.

According to the first aspect, the wavelength conversion device may include a substrate supporting the wavelength converter. The hollow motor may have a rotor part and a stator part rotating the rotor part about the rotation axis. The substrate may be supported by the rotor part.

In such a configuration, the wavelength converter can be rotated about the rotation axis of the hollow motor.

According to a second aspect of the present disclosure, a light source device includes: the wavelength conversion device according to the first aspect; and a light source emitting the first light incident on the wavelength conversion device.

Such a configuration can achieve effects similar to those of the wavelength conversion device according to the first aspect. Thus, a light source device that can stably emit light can be formed.

According to a third aspect of the present disclosure, a projector includes: the light source device according to the second aspect; a light modulator modulating light emitted from the light source device according to image information; and an optical projection device projecting the light modulated by the light modulator.

Such a configuration can achieve effects similar to those of the light source device according to the second aspect. Thus, a projector that can stably project light can be configured.

What is claimed is:

1. A wavelength conversion device comprising: a motor having a rotation axis and a hollow space; a wavelength converter converting incident first light in a first wavelength band to second light in a second wavelength band that is different from the first wavelength band; an optical element condensing the first light onto the wavelength converter, the optical element coupled to a rotor part of the motor; and a coupling member thermally coupled to the wavelength converter, wherein an optical axis of the optical element and the rotation axis are shifted from each other at least a part of the coupling member is arranged in the hollow space, and the motor changes a position of incidence of the first light on a light incident surface of the wavelength converter by rotating the optical element about the rotation axis, wherein a gap is formed between a light source casing and the coupling member; the optical element is held between the two ends of the rotor and the optical element overlaps the gap.

2. The wavelength conversion device according to claim 1, wherein
   the optical axis of the optical element, an optical axis of the first light incident on the optical element, and the rotation axis are shifted from each other.

3. The wavelength conversion device according to claim 1, wherein
   the wavelength converter is arranged in the hollow space.

4. The wavelength conversion device according to claim 1, wherein
   the motor rotates the wavelength converter about the rotation axis, and
   an optical axis of the first light incident on the wavelength converter and the rotation axis are shifted from each other.

5. A light source device comprising:
   a light source emitting first light; and
   the wavelength conversion device according to claim 1, on which the first light emitted from the light source is incident.

6. The wavelength conversion device according to claim 2, wherein
   the motor has the rotor part and a stator part rotating the rotor part about the rotation axis, and
   the optical element is supported by the rotor part.

7. The wavelength conversion device according to claim 4, further comprising
   an optical element condensing the first light onto the wavelength converter, wherein
   an optical axis of the optical element and the rotation axis are shifted from each other.

8. The wavelength conversion device according to claim 4, further comprising
a heat radiation member thermally coupled to the coupling member, wherein
the coupling member and the heat radiation member are rotated with the wavelength converter by the motor, and
at least a part of the heat radiation member is arranged outside the motor.

9. The wavelength conversion device according to claim 4, further comprising
a substrate supporting the wavelength converter, wherein
the motor has the rotor part and a stator part rotating the rotor part about the rotation axis, and
the substrate is supported by the rotor part.

10. The wavelength conversion device according to claim 4, further comprising:
a heat radiation member thermally coupled to the coupling member; and
a heat transfer member arranged between the coupling member and the heat radiation member, wherein
at least a part of the heat radiation member is provided outside the motor.

11. The wavelength conversion device according to claim 7, wherein
the optical axis of the first light incident on the wavelength converter and the optical axis of the optical element substantially coincide with each other.

12. The wavelength conversion device according to claim 10, wherein
the coupling member is rotated with the wavelength converter by the motor, and
the heat radiation member does not rotate and is fixed.

13. The wavelength conversion device according to claim 10, wherein
the heat transfer member is a thermally conductive grease.

14. The wavelength conversion device according to claim 10, wherein
the heat radiation member has a recess provided at a face of the heat radiation member, the face facing the coupling member, and
the recess holds the heat transfer member.

15. A projector comprising:
the light source device according to claim 5;
a light modulator modulating light emitted from the light source device; and
an optical projection device projecting the light modulated by the light modulator.

* * * * *